United States Patent [19]

Ozeki et al.

[11] Patent Number: 5,280,542

[45] Date of Patent: * Jan. 18, 1994

[54] XYZ COORDINATES MEASURING SYSTEM

[75] Inventors: Osamu Ozeki; Kazunori Higuchi; Shin Yamamoto, all of Aichi, Japan

[73] Assignee: Kabushiki Kaisha Toyota Chuo Kenkyusho, Aichi, Japan

[*] Notice: The portion of the term of this patent subsequent to Oct. 2, 2007 has been disclaimed.

[21] Appl. No.: 752,642

[22] PCT Filed: Dec. 26, 1990

[86] PCT No.: PCT/JP90/01716

§ 371 Date: Aug. 28, 1991

§ 102(e) Date: Aug. 28, 1991

[87] PCT Pub. No.: WO91/10111

PCT Pub. Date: Jul. 11, 1991

[30] Foreign Application Priority Data

Dec. 28, 1989 [JP] Japan .................. 1-340866

[51] Int. Cl.$^5$ .................. G06K 9/00; G06K 9/46; G01B 11/14; H04N 7/00
[52] U.S. Cl. .................. 382/8; 382/26; 382/28; 382/67; 364/559; 364/571.07; 364/474.37; 340/686; 356/375; 358/101; 250/206.1
[58] Field of Search .................. 382/8, 48, 18, 26, 28, 382/67, 1, 58, 33; 364/559, 571.07, 474.37, 474.36; 340/686; 356/375; 73/865.8; 358/101; 250/205, 206.1, 561; H04N 7/00

[56] References Cited

U.S. PATENT DOCUMENTS

| | | | |
|---|---|---|---|
| 4,396,945 | 8/1983 | DiMatteo et al. | 358/107 |
| 4,435,835 | 3/1984 | Sakow et al. | 382/8 |
| 4,498,778 | 2/1985 | White | 356/376 |
| 4,607,387 | 8/1986 | Miyagawa | 382/33 |
| 4,668,983 | 5/1987 | Werson | 358/106 |
| 4,731,853 | 3/1988 | Hata et al. | 382/1 |
| 4,794,262 | 12/1988 | Sato et al. | 250/560 |
| 4,961,155 | 10/1990 | Ozeki et al. | 364/559 |
| 5,076,697 | 12/1991 | Takagi et al. | 356/376 |
| 5,129,010 | 7/1992 | Higuchi et al. | 382/8 |

FOREIGN PATENT DOCUMENTS

| | | |
|---|---|---|
| 63-149507 | 6/1988 | Japan . |
| 64-78108 | 3/1989 | Japan . |
| 1-242906 | 9/1989 | Japan . |
| 63-279110 | 11/1989 | Japan . |
| 1-284982 | 11/1989 | Japan . |
| 2113832 | 8/1983 | United Kingdom . |

OTHER PUBLICATIONS

Japanese Laid-Open Patent Publication No. 209105/1985, "Displacement Measuring Instrument", Itaru Ichikawa, Oct. 21, 1985. Abstract only.

*Primary Examiner*—David K. Moore
*Assistant Examiner*—Michael Commarata
*Attorney, Agent, or Firm*—Oblon, Spivak, McClelland, Maier & Neustadt

[57] ABSTRACT

XYZ coordinates of an object are measured by projecting pulse slit light onto the object, imaging the slit line formed on the surface of the object by a TV camera, and processing the video signal from the camera according to the scanning signals from the camera. The position of the slit line on the camera is detected, based on the weighted average of the intensity values of the video signal. The relation of the position of the slit line to the actual XYZ coordinates on the object has been previously established, taking account of the distortion of the lens of the TV camera and stored in a look-up table. Data read from this table is stored in a memory in synchronism with the projection of each pulse slit light. The XYZ coordinates on the object can be accurately detected even though its physical position varies at a high speed or its reflectivity changes widely.

7 Claims, 11 Drawing Sheets

XYZ COORDINATES MEASURING SYSTEM

TECHNICAL FIELD

The present invention relates to an XYZ coordinates measuring system and, more particularly, to improvements in an apparatus for accurately and quickly measuring XYZ coordinates on a moving or vibrating object whose physical position varies along a slit line. Also, the invention relates to improvements in an apparatus for accurately and quickly measuring XYZ coordinates on an object which exhibits very different reflectivities because it is painted in different colors.

BACKGROUND ART

In production processes for manufacturing mechanical parts or products, it is often required that XYZ coordinates on a moving or vibrating object be detected at a high speed, for measuring the dimensions of the object or for inspecting it. Especially, where the object to be investigated has a three-dimensional contour, there is strong demand for quick detection of the XYZ coordinates of numerous points on the surface of the object under investigation to efficiently and precisely measure the three-dimensional profile of the object, for grasping the geometrical features of the object. One known measuring means consists in projecting pulses of slit light onto the surface of an object and arithmetically processing only the vicinities of the two-valued slit light image to quickly detect the profile of the moving object (Japanese Patent Laid-Open No. 78109/1989).

In this known measuring means, the central position of the slit line is transformed into a thin line after the central position is converted into two values. Therefore, the ability to resolve the central position of the slit line is 0.5 picture element and thus the accuracy with which the profile is detected is poor. Also, a special camera controller and a special arithmetic control portion are necessary to read parts of TV camera signals. Hence, the system is expensive. In this way, some problems must be solved for putting the system into practical use.

The present inventor and others have devised an apparatus which detects XYZ coordinates on a real-time basis by the optical triangulation, using a slit light source and a TV camera. Each time the TV camera takes a horizontal scan, the center of gravity of the slit line is detected, and then the XYZ coordinates are detected on a real-time basis by referring to a table of data.

However, this apparatus is unable to detect XYZ coordinates appropriately. In particular, slit light is projected continuously, and the reflected light is imaged by the TV camera for 1/30 second. If the object under investigation moves during this time interval of 1/30 second, then the image is blurred.

Where disturbing light having a wide range of wavelengths such as sunlight exists in a factory or the like, a sufficiently high signal-to-noise ratio (referred to as s/n hereinafter) will not be obtained using only a band-pass filter which passes only the wavelength of the slit light source.

SUMMARY OF THE INVENTION

The present invention is intended to solve the foregoing problems with the prior art techniques. It is an object of the invention to provide an XYZ coordinates measuring system which correctly detects XYZ coordinates on an object moving at a high speed, can change the intensity of the projected slit light over a wide range to obtain good reflected light from objects exhibiting unprecedentedly greatly different reflectivities, automatically and appropriately adjusts the intensity of the projected slit light for objects exhibiting different reflectivities, makes a correct measurement of XYZ coordinates even though multiple reflection occurs, and is capable of correctly measuring XYZ coordinates even under disturbing light such as sunlight.

An XYZ coordinates measuring system forming a first aspect of the present invention comprises: a slit light source for projecting slit light toward the surface of an object to be measured at a given angle; a TV camera for imaging the slit line formed on the surface of the object by the slit light; a pulse signal generating circuit which supplies a pulse light projection signal for driving the slit light source to project a pulse light in synchronism with the field signal from the TV camera and which outputs a signal for setting a calculation period; an A/D converter circuit for converting the video signal outputted from the TV camera in synchronism with the horizontal scan of the TV camera into digital video signal Vi; a threshold value-setting circuit that sets a threshold value used to detect the slit line from the video signal; a slit line detecting circuit outputting a slit line detection signal only when the digital video signal Vi is in excess of the threshold value; a horizontal address generating circuit for producing horizontal addresses Ki indicating the positions of horizontal picture elements of the image elements of the TV camera; an accumulative adder circuit for accumulating the video signal Vi outputted via the A/D converter circuit while the slit line detecting circuit is outputting the slit line detection signal; an accumulative multiplier circuit for accumulating the product Vi×Ki of the video signal Vi outputted via the A/D converter and the horizontal address Ki outputted from the horizontal address generating circuit while the slit line detecting circuit is outputting the slit line detection signal; a horizontal imaging position detecting circuit which divides the output ΣVi×Ki from the accumulative multiplier circuit by the output ΣVi from the accumulative adder circuit and produces the resulting quotient Ks as a horizontal imaging position; a vertical imaging position detecting circuit which counts the horizontal synchronous signals from the TV camera and detects the vertical imaging position Ls; a look-up table in which tables showing the relations of horizontal and vertical imaging positions to the actual values of the XYZ coordinates on the surface of the object have been previously stored, correcting the distortion of the lens of the TV camera, and from which the values of the XYZ coordinates on the surface of the object are taken according to the detected horizontal imaging position Ks and the detected vertical imaging position Ls; and a memory to which the XYZ coordinates taken from the look-up table are written only during certain periods in synchronism with the signal for setting the calculation period.

The XYZ coordinates measuring system constructed as described above projects pulse slit light toward the surface of an object whose position varies physically. For example, the object moves or vibrates. The height and the width of the pulse slit light are set by the pulse signal generating circuit. The slit line produced by each pulse slit light is incident on the TV camera only during the short duration of the pulse. Therefore, the slit light image created by the TV camera is free from blur and thus sharp. In consequence, the horizontal imaging position of the slit light image can be detected accurately. This permits precise detection of the XY coordinates.

The average energy of the projected pulse slit light can be stably varied over a range of 1 : more than 50,000 (the range of the variable output of the light source corresponding to the height of the pulse of 1 : about 50×the range of the variable pulse width of 1 : more than 1,000). Therefore, a good reflected signal can be derived from an object whose reflectivity varies widely such as an automotive body that has been sprayed with paint. The values of the XYZ coordinates taken from the look-up table are written to the memory for storing XYZ coordinates only while the pulse signal generating circuit is producing the calculation period setting signal. Hence, the values of the XYZ coordinates of the object at the moment when the pulse is projected are precisely measured. The calculation period is determined by the characteristics of the TV camera. Where the TV camera consists of CCDs, it generally picks up an image in one field period and then produces a video signal indicating the image within the frame period immediately subsequent to that field period. In this case, the frame period immediately subsequent to the field in which the pulse slit light was projected is the calculation period.

The TV camera successively delivers video signals in synchronism with the horizontal scans of the camera. Whenever the output of one horizontal scanning video signal from the TV camera is completed, the horizontal imaging position Ks and the vertical imaging position Ls of the slit line on that horizontal scanning line are immediately detected. The present invention exploits weighted averaging especially for detection of the horizontal imaging position Ks, thus realizing accurate position detection.

In one feature of the invention, the threedimensional coordinates (X, Y, Z) of numerous points P at which the slit line is measured are obtained almost simultaneously with the detection of the imaging positions Ks and Ls and on a real-time basis. These numerous points P (given by $P_0$, $P_1$, etc.) exist on the scanning lines, corresponding to the imaging positions Ks and Ls.

As another feature of the invention, the correspondence of the horizontal imaging position Ks and the vertical imaging position Ls to the three-dimensional coordinates (X, Y, Z) on the actual surface of the object is previously measured and established, taking account of the distortion of the lens of the TV camera. The results are used to create tables inserted in the look-up table. In response to the detected horizontal imaging position Ks and the vertical imaging position Ls, the values of the threedimensional coordinates (X, Y, Z) on the surface of the object can be delivered correctly and quickly without performing any special calculation and without being affected by the distortion of the lens.

BEST MODE FOR CARRYING OUT THE INVENTION

Figure 1:
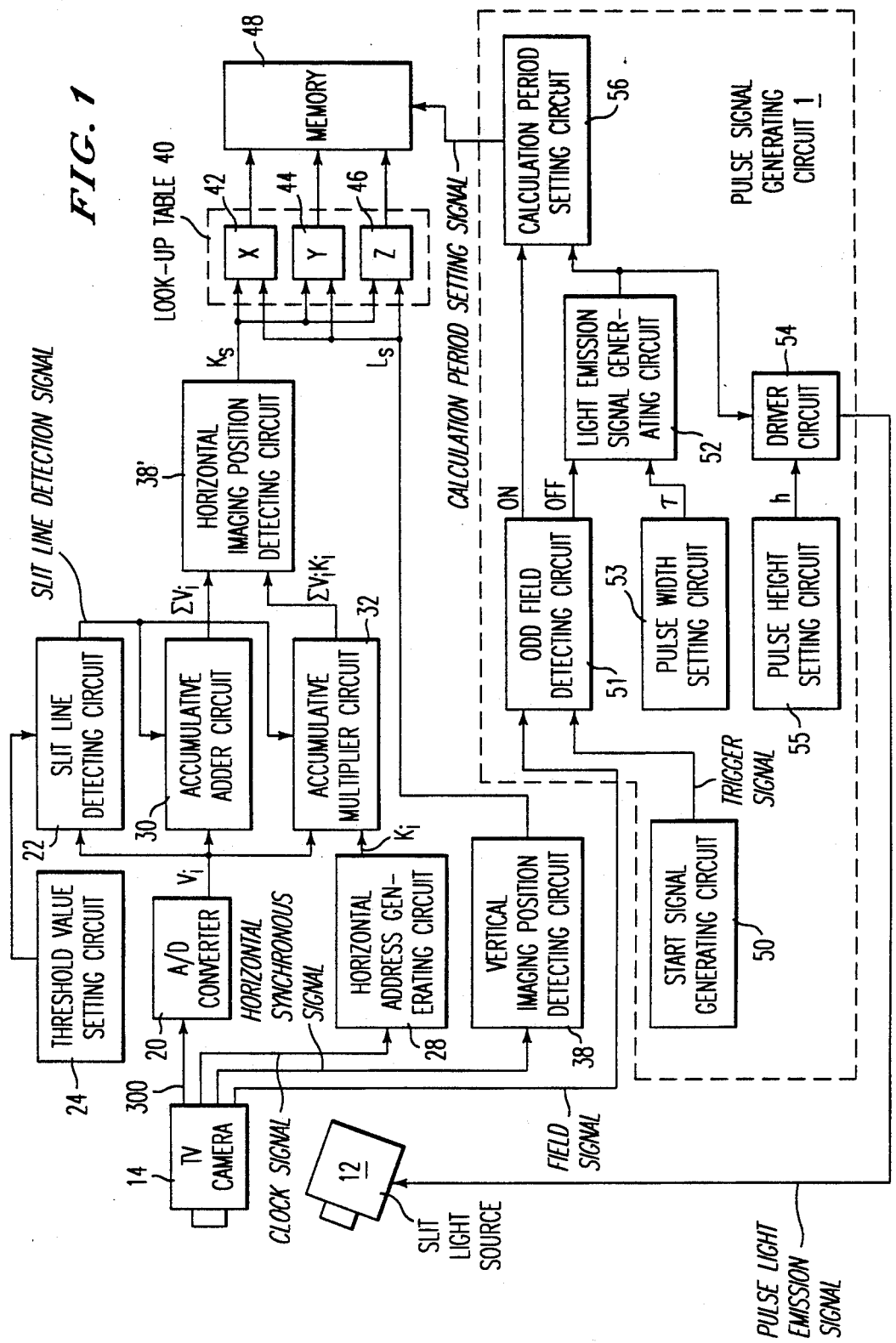
FIG. 1 is a block diagram of a first example of the invention.

The second aspect of the present invention is characterized in that the pulse signal generating circuit outputs the calculation period setting signal to the memory only during the frame period immediately subsequent to the field period in which a signal was outputted to drive the slit light source to project a pulse light. Generally, a CCD TV camera takes an image during one field period and then delivers a video signal indicative of the acquired image within one frame period immediately subsequent to that field period. In this way, the values of coordinates at the time of emission of the pulse slit light are correctly-stored in the memory.

Arithmetic operation synchronized with the projection of the pulse slit light enables correct and real-time detection of the XYZ coordinates on an object even though it is moving at a high speed or vibrating.

The third aspect of the present invention is characterized in that the pulse signal generating circuit includes a start signal generating circuit which produces a start signal indicating the start of a measurement corresponding to the position of the object to be measured within the measured region, and outputs a signal for driving the slit light source to project a pulse light within the field appearing immediately subsequent to the generation of the start signal.

In the XYZ coordinates measuring system of the above structure forming the third aspect of the invention, the pulse signal generating circuit outputs a start signal from a start signal generating circuit to indicate the start of a measurement according to the position of the object within the measured region. The field signal from the TV camera is accepted, and the odd-numbered condition and the even-numbered condition of the field are detected. Thus, a signal for driving the slit light source to project a pulse light is issued during the field period immediately subsequent to the input of the start signal. The calculation period setting signal is outputted to the memory during one frame immediately after the field during which the signal for the projection of the pulse light was given. A CCD TV camera picks up an image during one field period and then outputs a video signal indicative of the image within one frame period immediately subsequent to that field period and so the values of the coordinates at the instant when the pulse slit light was emitted are correctly stored in the memory. Arithmetic operation synchronized to the projection of the pulse slit light makes it possible to correctly detect XYZ coordinates on a real-time basis even though the object is moving at a high speed or vibrating.

The projection of the pulse slit light also makes it possible to vary the average intensity, or the energy, of the projected slit light over a very wide range. Where a semiconductor laser is used as the slit light source, the range of the stably varied output is 1 : about 50. Therefore, when the slit light is emitted continuously, the range of the energy of the emitted slit light is 1 : about 50. The coating on an automotive body varies widely from white to black. In addition, the coating is made glossy. In this way, the reflectivity for the light changes quite greatly, and the range of the variable reflectivity amounts to even 1 : 1,000 or more. For this reason, where the slit light is irradiated continuously, it is impossible to obtain stable reflected light based on the slit light, irrespective of whether the color of the body is white or black. However, the use of the projection of pulses makes it possible to control the average output of the light by controlling the width of the pulses, because a CCD camera stores light energy applied to the camera during one field period, and because it substantially follows that continuous slit light of the intensity of $h \times \tau/\tau f$ ($\tau f$ is the period of one frame) is emitted, provided that the pulse width and the pulse height of the slit light are $\tau$ and h, respectively.

The range of the height h can be varied over a range substantially equal to the above-described range of the laser output, i.e., 1 : about 50. It is easy to vary the ratio $\tau/\tau f$ over the range of 1 : more than 1,000. Eventually, the average intensity or energy can be changed over the range of $1:50 \times 1,000 \ 1=1$ L more than 50,000. As a result, good reflected light can be derived even from an object showing quite different reflectivities by having glossy white portions and black portions. Consequently, correct measurement of XYZ coordinates can be accomplished.

The fourth aspect of the invention is characterized in that a control circuit is included which controls the intensity of the projected slit light according to at least one of the width of the slit line and the maximum intensity of the slit line detected by each horizontal scan.

The slit line is detected each time a horizontal scan is made. At least one of the width and the maximum intensity of the detected slit line increases with increasing the reflectivity of the object under investigation even if the intensity of the projected slit light is kept constant. The intensity of the projected slit light is controlled in such a way that the width or the maximum intensity of the slit line detected by each horizontal scan assumes a predetermined value. In this way, a constant reflected light can be obtained at all times. The intensity or energy of the projected slit light can be controlled by varying at least one of the width and the height of the pulse light. It is also possible to set the intensity of the slit light in such a way that the product of the width of the slit line and the maximum intensity becomes equal to a predetermined value whenever a horizontal scan is made.

The fifth aspect of the invention is characterized in that it includes a control circuit which controls the intensity of the projected slit light in response to the output $\Sigma Vi$ from the accumulative adder circuit.

Since the output $\Sigma Vi$ from the accumulative adder circuit is obtained by summing up every intensity of the slit line, more accurate automatic setting of the intensity can be performed for the following reasons than in the case in which only the width or the maximum intensity of the slit line is merely used to set the intensity of the projected slit light.

Figure 7A:
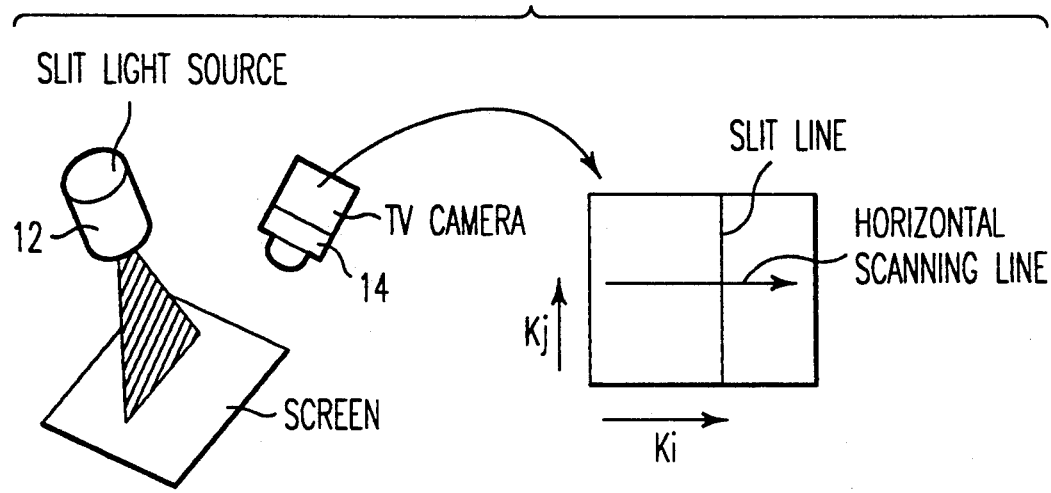
FIGS. 7(a) and 7(b) are diagrams showing the conditions of video signals from a TV camera.
Figure 7B:
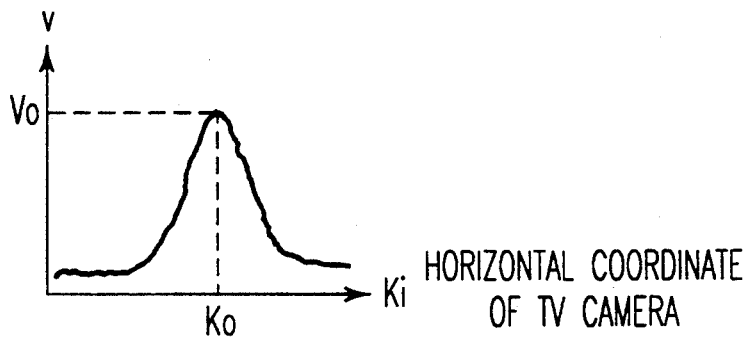

As shown in FIGS. 7(a) and 7(b), where a semiconductor laser is used as the slit light source, the intensity of the signal for one horizontal scan when the slit line is observed by the TV camera can take a Gaussian distribution given by $$v = V_0 \cdot \exp[-(K_0-K_i)//b]$$

where $K_0$ is the abscissa of the TV camera when the intensity v assumes its maximum value $V_0$ and B is a constant representing a variance which defines a Gaussian distribution form.

Figure 8:
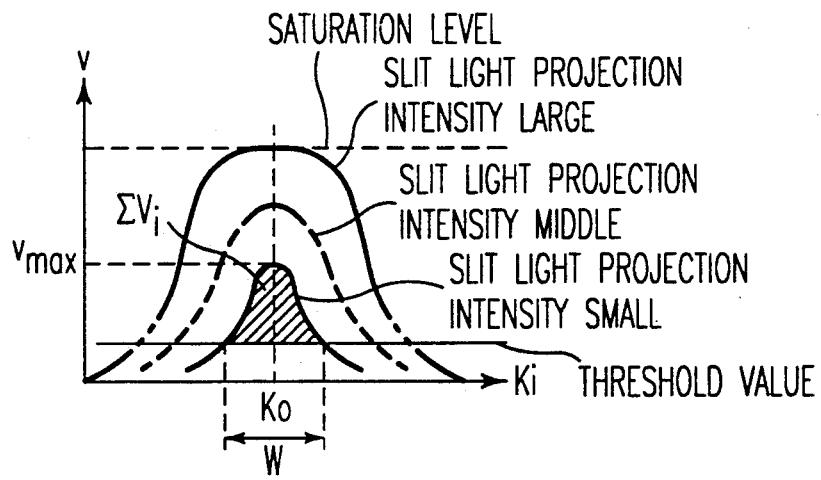
FIG. 8 is a graph in which the intensity of the video signal from a TV camera is plotted against the intensity of projected slit light.

As an example, when the electric current for driving the semiconductor laser acting as the slit light source is increased to increase the intensity of the projected slit light, the maximum value $V_0$ in the above equation increases. Generally, B also increases. This tendency is shown in FIG. 8. If the driving current is increased further, the CCDs of the TV camera are generally saturated, and the signal intensity v is also saturated, as can be seen from FIG. 8. Under this condition, the relation of the intensity of the projected light or the driving current to the maximum signal output Vmax, the width W at which the signal v crosses the threshold value, and the area $\Sigma Vi$ at which the signal v exceeds the threshold value are shown in FIGS. 9(a), 9(b), 9(c), respectively.

Figure 9A:
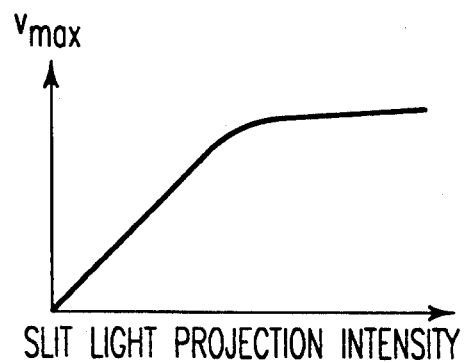
FIG. 9(a) is a graph showing variations of Vmax with varyinq the intensity of projected slit light.
Figure 9B:
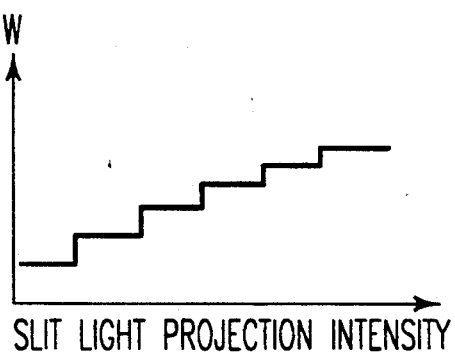
FIG. 9(b) is a graph showing variations of W with varying the intensity of projected slit light.
Figure 9C:
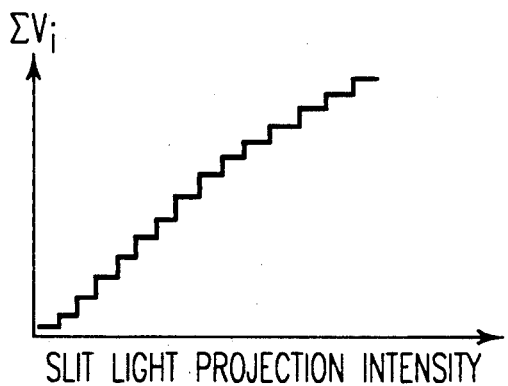
FIG. 9(c) is a graph showing variations of $\Sigma Vi$ with varying the intensity of projected slit light.

As shown in FIG. 9(a), the maximum signal output Vmax is saturated at large intensities of the projected slit light. If noises are superimposed on the signal, it is easily affected. The width W is not easily saturated, but it is quantized, i.e., it changes in a stepwise fashion, as shown in FIG. 9(b), because the number of the pixels of the TV camera is finite On the other hand, the area $\Sigma Vi$ is obtained by integration and so it is less likely to be saturated at larger intensities of the slit light. Also, this area varies at shorter steps than the width W. Hence, the use of the area $\Sigma Vi$ makes it possible to automatically and accurately set the intensity of the projected slit light over a wide range.

The sixth aspect is characterized in that the shutter of the TV camera is opened only while the slit light taking the form of pulses is being projected. As a result, reflected light can be detected with good signal-to-noise ratio under the presence of disturbing light having a broad range of wavelengths such as sunlight. This will be described below in greater detail.

The TV camera integrates the incident light only for the time of one frame $\tau_F$ (=33.3 msec). The result is output as a video signal. Let $a_{sl}$ (joule/sec) be the energy of the pulse slit light having a pulse width of $\tau_P$ incident on the TV camera per unit time. Let $a_{su}$ (joule/sec) be the energy of sunlight incident on the camera per unit time. If the shutter does not exist, the incident energy (Asl) of the pulse slit light for the time of one frame and the incident energy (Asu) of sunlight for the time of one frame are derived by performing integration with respect to time, and respectively given by $$Asl \text{ (joule)} = \int_0^{\tau P} a_{sl} \, dt = \tau_P \, a_{sl}$$

$$Asu \text{ (joule)} = \int_0^{\tau F} a_{su} \, dt = \tau_F \, a_{su}$$

The signal-to-noise ratio is given by $$Asl \, / \, Asu = \tau_P \, a_{sl} / \tau_f \, a_{su}$$

When the shutter of the TV camera is opened only during the period $\tau_P$ of the pulse projection, the energy (Asl') of the pulse slit light incident on the TV camera and the energy (Asu') of sunlight incident on the TV camera are respectively given by $$Asl' \text{ (joule)} = \int_0^{\tau P} a_{sl} \, dt = \tau_P \, a_{sl}$$

$$Asu' \text{ (joule)} = \int_0^{\tau P} a_{su} \, dt = \tau_P \, a_{su}$$

The signal-to-noise ratio is given by $$Asl'/Asu' = \tau_P \, a_{sl} / \tau_P \, a_{su} = a_{sl}/a_{su}$$

It is assumed that the pulse width $\tau_P$ is 33.3μsec. It is also assumed that the shutter of the TV camera is not actuated even though the solar energy per unit time $a_{su}$ is one thousandth of the energy of the pulse slit per unit time $a_{sl}$. Under this condition, the signal-to-noise ratio is given by $$33.3 \times 10^{-6} \times a_{sl} / (33.3 \times 10^{-3} \times a_{sl}/1000) = 1$$

Figure 10:
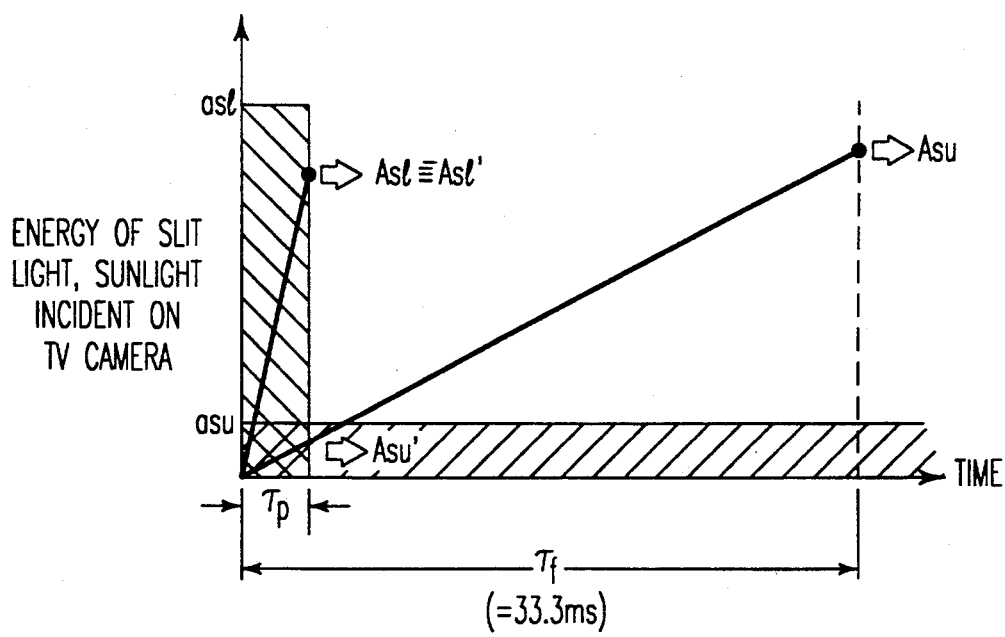
FIG. 10 is a diagram showing the manner in which the energy of slit light and the energy of sunlight are incident on a TV camera.

On the other hand, when the shutter is actuated, the signal-to-noise ratio is $a_{sl}/(a_{sl}/1000)=1000$ under the same condition. In this way, the signal-to-noise ratio is improved greatly (see FIG. 10).

A seventh aspect of the invention is characterized in that a window is set within a desired region during the horizontal scan of the TV camera and that coordinates are calculated only for the slit line existing inside this window. This is intended to eliminate the effects of multiple reflection of slit light occurring on a concave object. Where the shape of the object is known, the manner in which multiple reflection occurs can be often forecasted. In this case, a window is previously set in the portion where primary reflection signals are produced. This makes it possible to correctly detect XYZ coordinates without being affected by the higher order reflections such as secondary and tertiary reflections.

EXAMPLE 1

Figure 2:
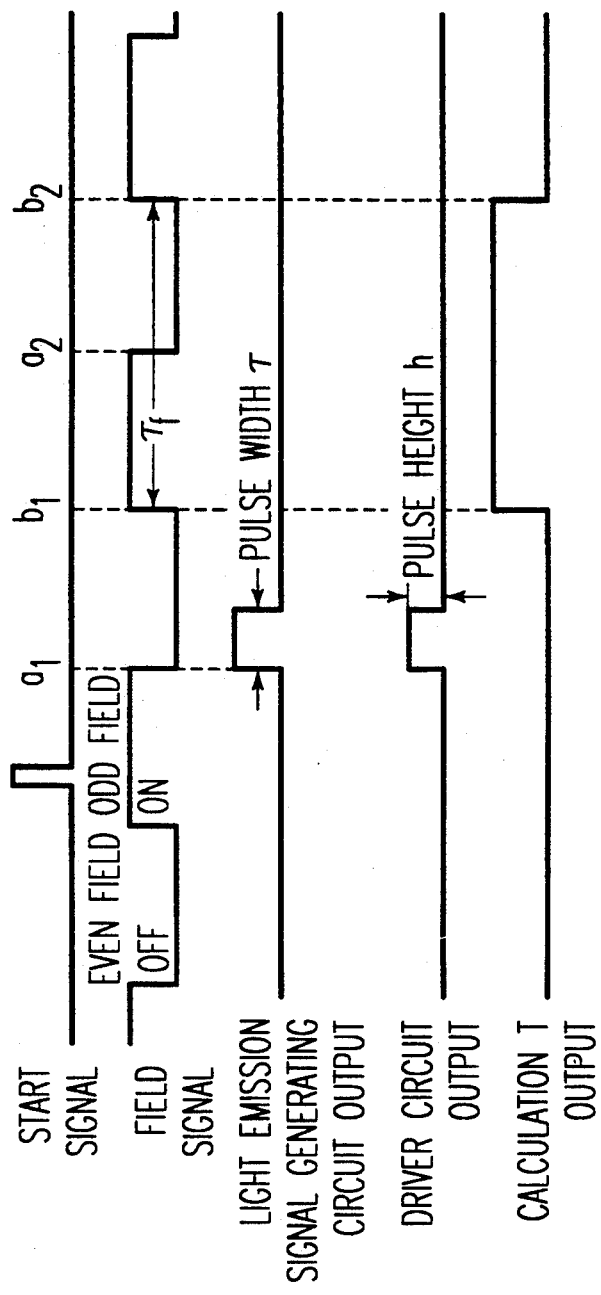
FIG. 2 is a timing chart illustrating the first example of the invention.

Referring to FIGS. 1 and 2, there is shown the first example of the XYZ coordinates measuring system according to the invention. This example corresponds to the first and second aspects.

The apparatus of the first example includes a slit light source 12 and a TV camera 14. As shown in FIG. 1, a pulse slit light having a pulse width and a pulse height is projected from the slit light source 12 toward a three-dimensional object at a given angle in synchronism with the field signal from the camera 14 set by a pulse signal generating circuit 1. A slit line formed on the object is imaged by the camera 14.

It is assumed that the TV camera consists of CCD. Pulse slit light is projected, and XYZ coordinates are computed on a real-time basis in the following manner. In this case, the projection of each pulse must be started and ended within the field immediately prior to the frame in which calculation is carried out, in order to correctly obtain XYZ coordinates from the TV camera output image derived by projecting pulse slit light. This is because a CCD camera stores the energy of light entered during a given field period to detect an image and then the camera delivers a video signal indicative of the image during one frame period immediately subsequent to the given field period.

An example in which the emission of pulses is performed in each even field and the calculation for obtaining coordinates is carried, out in the following one frame (odd field plus even field) will now be given. This is not described in detail by referring to FIGS. 1 and 2.

As shown in FIG. 2, assume that a start signal generating circuit 50 supplies a start signal to a field detecting circuit 51 included in a pulse signal generating circuit 1 in each odd field of the TV camera. Then, the odd field detecting circuit 51 detects the instant $a_1$ at which the odd field immediately subsequent to the input of the start signal ends. The output signal from the detecting circuit 51 is supplied to a light emission signal generating circuit 52 to which a given pulse width $\tau$ is furnished from a pulse width setting circuit 53. The light emission signal generating circuit 52 produces a light emission signal of the pulse width $\tau$ at the instant of $\tau_1$ to a driver circuit 54. This driver circuit 54 is supplied with a given pulse height h from a pulse height setting circuit 55. The driver circuit 54 delivers a drive signal having pulse width $\tau$ and pulse height h to the slit light source. The light source emits a pulse slit light during the even field immediately subsequent to the input of the start signal, or for the period between the instant $a_1$ and an instant $b_1$. In response to this projection of the pulse slit light, a still slit image is picked up by the TV camera even though the object is vibrating. The aforementioned light emission signal is also fed to a calculation period setting circuit 56 which is supplied with a field start signal from the odd field detecting circuit 51. In this way, the period setting circuit 56 keeps supplying a calculation period setting signal to a memory 48 during one frame period immediately subsequent to the generation of the light emission signal. In this case, this one frame period begins at the instant $b_1$ and ends at an instant $b_2$.

A coordinate calculating circuit consisting of circuits 20–46 repeats calculation of coordinates on a real-time basis. The calculated values of coordinates are taken from a table of coordinates and written to the memory 48. The results of computation of coordinates within the period for which the calculation period setting signal is applied to the memory 48 are valid and stored in the memory 48. In this way, the values of coordinates calculated during one frame period immediately subsequent to the emission of the pulse slit light are correctly stored in the memory 48.

Calculations synchronized with the emission of the pulse slit light make it possible to correctly detect the XYZ coordinates of the object on a real-time basis even though the object is moving at a high speed or vibrating. Since the light source is made to emit a pulse, the XYZ coordinates of the vibrating object can be detected even if the TV camera is not equipped with a special function such as shutter function Furthermore, the average energy of the projected slit light can be changed over a quite wide range because the light is emitted in the form of pulses. Where a semiconductor laser is used as the slit light source 12, the stable range of the variable output is 1 : about 50. Therefore, when the slit light is emitted continuously, the range of the intensity or energy of the projected slit light is 1 : about 50. Because the coating on an automotive body can vary from white to black, and because the coating is rendered glossy, the reflectivity for the light varies quite widely and can be as great as 1: more than 1,000. For these reasons, with continuous illumination of the slit light, it is impossible to obtain stable reflected light from the slit light, irrespective of whether the color of the body is white or black. However, the novel emission of the pulses makes it possible to control the average output of the light by controlling the width of each pulse, for the following reasons.

Since a CCD camera stores the light energy applied during one frame period, the same results arise as when slit light of the intensity of $h \times \tau/\tau_f$ is emitted continuously, where $\tau$ is the width of the pulse of the slit light, and $h$ is the height of the pulse.

The range of the height $h$ is 1 : about 50 of the above-described range of the variable laser radiation and so it is easy to set the range $\tau/\tau_f$ to 1 : more than 1,000. Eventually, the range of the average energy can be set to 1 : more than $50 \times 1,000 = 1$ : more than 50,000. The result is that good reflected light is obtained and correct measurement of XYZ coordinates can be attained even if the object surface is glossy and exhibits quite different reflectivities because it has white and black colors.

The invention is not limited to the above example. Of course, all or some of the functions of the odd field detecting circuit 51, the light emission signal generating circuit 52, the pulse width setting circuit 53, the pulse height setting circuit 55, and the calculation period setting circuit 56 shown in FIG. 1 may be implemented in software in an external host computer.

In the above example, the emission of each pulse is carried out in an even field. Calculation of coordinates is effected in the following frame (an odd field plus an even field). Alternatively, the emission of each one pulse is made in an odd field, followed by computation of coordinates in the following frame (an even field plus an odd field). Moreover, the pulse light may be emitted in the field immediately subsequent to the input of the start signal without previously determining whether the light is emitted in an odd field or in an even field. Calculation may be performed in the immediately subsequent frame.

In the present first example, the horizontal address generating circuit 28 includes a counter which counts the clock signals delivered from the TV camera 14. The total count Ki is supplied as a horizontal address indicating the horizontal position of an imaging device to an accumulative multiplier circuit 32.

The above-described accumulative adder circuit 30 consists of a multiplicative accumulator that is a piece of hardware. The accumulative adder circuit 30 produces the product of the output Vi from the A/D converter circuit 20 and value 1, and accumulates the resulting products while a slit line detecting circuit 22 is detecting a video signal exceeding the threshold value determined by a threshold value setting circuit 24 and delivering the detected video signal as a slit line. Each accumulated value that is successively calculated and delivered is given by $$\sum_{i=is}^{ic} Vi$$

This accumulation is repeated whenever the TV camera 14 produces a horizontal synchronous signal. Accordingly, the accumulative adder circuit 30 produces the above-described calculated value each time the camera 14 produces a horizontal scanning video signal.

The above-described accumulative multiplier circuit 32 consists of a multiplicative accumulator that is a piece of hardware. The multiplier circuit 32 produces the product of the output signal Vi from the A/D converter circuit 20 and the horizontal address Ki from a horizontal address generating circuit 28, and accumulates the resulting products while the slit line detecting circuit 22 is delivering the slit line detection signal. The accumulated values which are successively calculated and delivered are given by $$\sum_{i=is}^{ic} Vi \times Ki$$

This accumulation is repeated whenever the TV camera 14 produces a horizontal synchronous signal. Thus, each time the camera 14 produces a horizontal scanning video signal, the accumulative multiplier circuit 32 delivers the calculated value.

Both accumulated values $\Sigma Vi$ and $\Sigma Vi \times Ki$ are supplied to a horizontal imaging position detecting circuit 38' consisting of a divider which divides the latter value by the former value to obtain the horizontal imaging position Ks.

In the first example, the vertical imaging position detecting circuit 38 is composed of a counter to detect the number given to the horizontal line presently scanned by the TV camera 14, or the vertical imaging position Ls.

Also, in the first example, the accumulative adder circuit 30 and the accumulative multiplier circuit 32 each consist of a piece of hardware. The time by which the calculation is delayed is tens of nanoseconds. Therefore, in the present first example, $\Sigma Vi$, $\Sigma Vi \times Ki$, and Ls can be detected after a lapse of tens of nanoseconds from the end of each horizontal scan in the latest case.

Moreover, in the first example, where a commercially available standard divider in the form of hardware is used as the horizontal imaging position detecting circuit 38', the horizontal imaging position Ks can be detected within 5 to 6 microseconds after the end of each effective horizontal scan, since the time required for the division operation is several microseconds. The horizontal imaging position Ks and the vertical imaging position Ls at each point P are detected in this way and inputted into the look-up table 40. In this first example, tables showing the relation of the horizontal imaging position Ks and the vertical imaging position Ls to actual three-dimensional coordinate values (X, Y, Z) at each point on the surface of the three-dimensional object 10 under investigation have been previously created, taking the effects of the distortion of the lens of the TV camera into account, and have been stored in the look-up table 40. Whenever the horizontal imaging position Ks and the vertical imaging position Ls are entered, the corresponding coordinates (X, Y, Z) are delivered to the memory 48.

Accordingly, in the present first example, whenever the horizontal imaging position Ks and the vertical imaging position Ls are detected, the three-dimensional coordinates (X, Y, Z) at the measured point P on the object 10 can be quickly delivered as correct values without performing any special arithmetical operation or processing in software, the coordinates being corrected for the lens distortion.

In the present first example, this look-up table 40 consists of an X coordinate table 42, a Y coordinate table 44, and a Z coordinate table 46. These tables 42, 44, and 46 are formed by the use of a ROM in which tables of data indicating the relations of Ks and Ls to the three-dimensional coordinates X, Y, Z have been previously stored.

Simultaneously with the end of each effective horizontal scanning period, the positions Ks and Ls are placed into the tables 42, 44, and 46. Then, the corresponding three-dimensional coordinates (X, Y, Z) after the lapse of hundreds of nanoseconds from the input of the positions Ks and Ls are taken from the tables 42, 44, and 46 and written to the memory 48 only while the calculation period setting signal from the pulse generating circuit is being entered.

In the first example, the memory 48 consists of a semiconductor memory having addresses corresponding to the numbers given to the horizontal lines of the TV camera 14.

The three-dimensional coordinates (X, Y, Z) read from the tables 42, 44, and 46 are successively stored at the addresses specified by the vertical imaging position Ls, or the numbers given to the horizontal lines of the TV camera 14, delivered from the vertical imaging position circuit 38. In this way, memory addresses are directly specified without via the computer. This method is called direct memory addressing (DMA).

When data is directly stored in the semiconductor memory in this way, the writing of data is completed within hundreds of nanoseconds after coordinate values are placed into the memory. That is, writing of three-dimensional coordinates (X, Y, Z) at one point is completed within about 1 microsecond after the end of each effective horizontal scanning period.

In this way, in the apparatus of the first example, the operation for detecting and storing the three-dimensional coordinates (X, Y, Z) at one point corresponding to a slit line on a horizontal line can be completed within about 6 or 7 microseconds after the end of each effective horizontal scanning period of the TV camera 14, i.e., completed within the retrace interval.

As a result, according to the first example, the three-dimensional coordinates at one point can be detected during the period of each horizontal scan of the TV camera 14, or 63.5 microseconds. Hence, the three-dimensional coordinates of each point along the slit line can be measured on a real-time basis.

In the present first example, software processing performed by a microcomputer can also be used in performing a division for detecting the horizontal imaging position Ks and writing coordinates X, Y, Z to the semiconductor memory. At this time, a period of about 20 microseconds is required for the division, and a period of 20 microseconds is necessary for the writing to the memory. In these states, these operations cannot be completed within the retrace interval.

To avoid this undesirable phenomenon, $\Sigma Vi$ and $\Sigma Vi \times Ki$ are placed into the microcomputer. Then, a division is performed to find the horizontal imaging position Ks. Subsequently, this position Ks is stored in a latch circuit provided separately only during one horizontal scanning period. The output from the latch circuit is fed to the look-up table 40.

In this way, the output from the look-up table 40 is retained during one horizontal scanning period. During this period, the coordinates X, Y, Z read from the look-up table 40 are written to the semiconductor memory, using the microcomputer, only while the calculation period signal from the pulse generating circuit is being entered.

This procedure is a kind of pipeline processing, since data about the coordinates of the measured point existing in the present horizontal line is stored during the scan of the next horizontal line. This processing makes it possible to detect and store the three-dimensional coordinates of each point within the horizontal scanning period of 63. 5 microseconds and to measure the X, Y, Z coordinates of each point along the slit line on a real-time basis even where a microcomputer is employed for calculation of the horizontal imaging position Ks and for writing of data into the semiconductor memory, though there is a delay of one horizontal scan.

EXAMPLE 2

Figure 3:
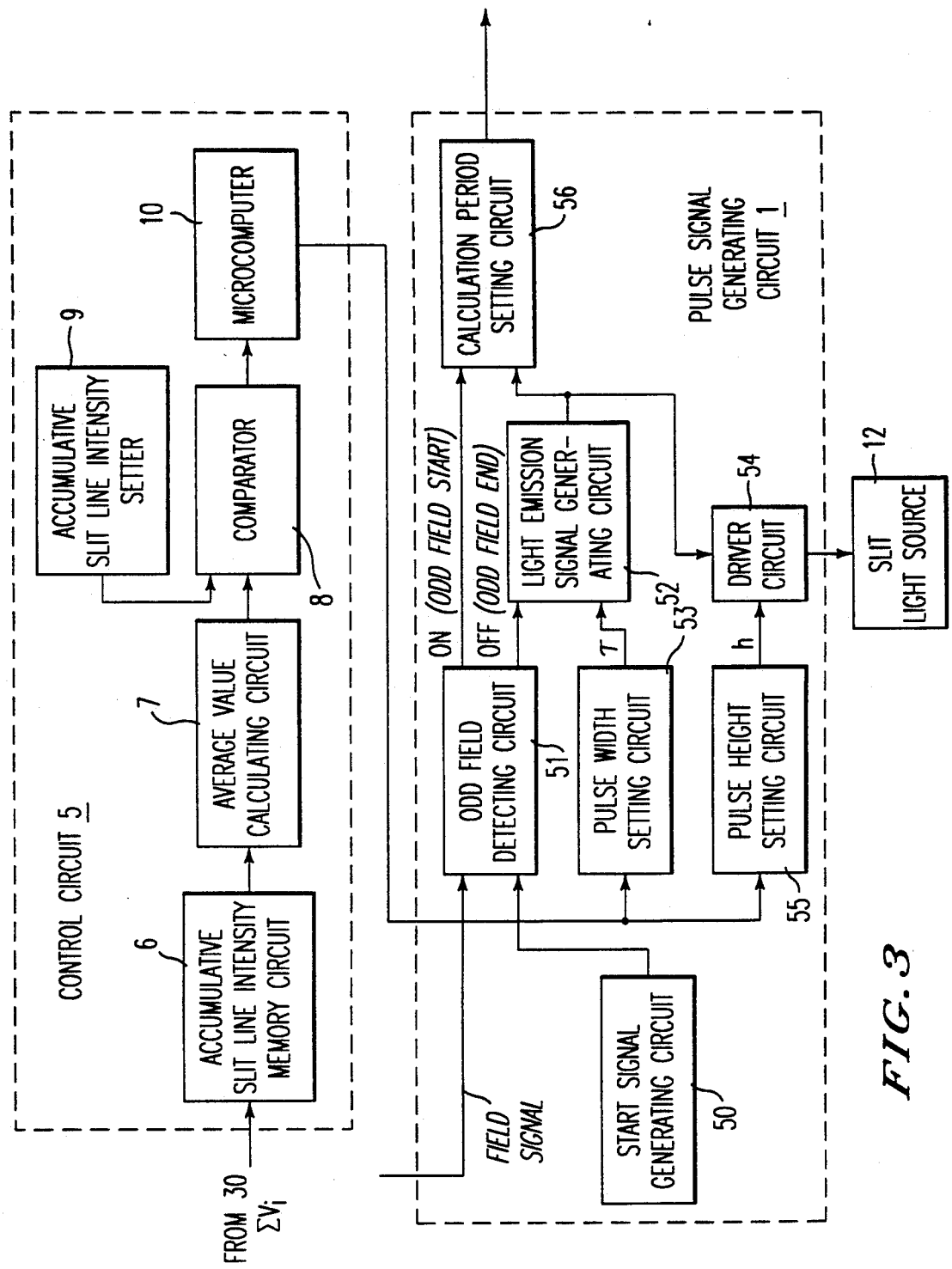
FIG. 3 is a block diagram of a second example of the invention.

Referring to FIG. 3, there is shown the second example of the present invention. This example differs from the first example in that a control circuit 5 comprises an accumulative slit line intensity memory circuit 6, an average value calculating circuit 7, a comparator 8, an accumulative slit line intensity setter 9, and a microcomputer 10. This microcomputer 10 is connected with both pulse width setting circuit 53 and pulse height setting circuit 55 of the pulse signal generating circuit 1.

Figure 4:
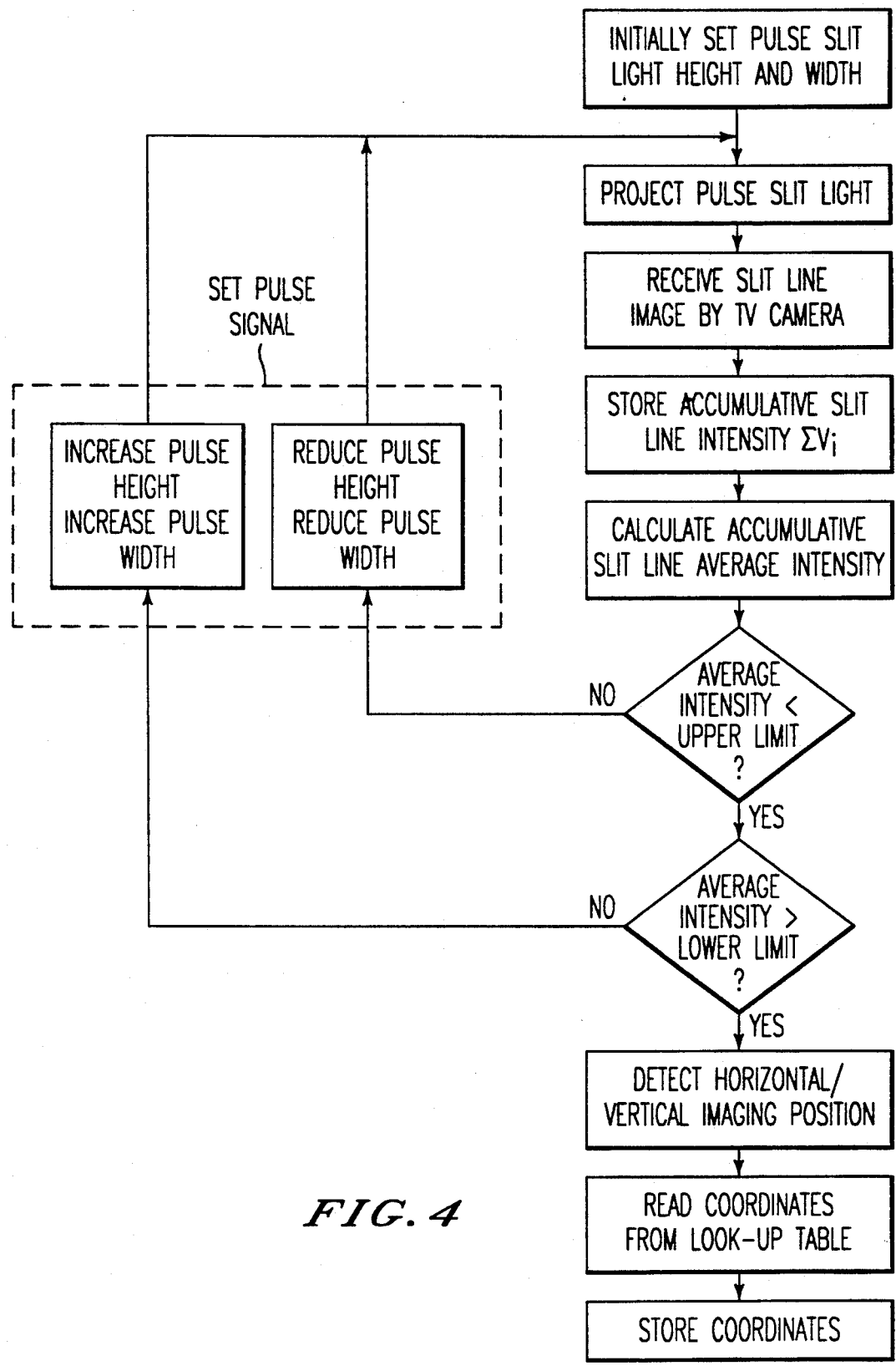
FIG. 4 is a flowchart illustrating the second example of the invention.

The operation of the second example as described above is now described by referring to FIG. 4. The output $\Sigma Vi$ indicating the accumulative slit line intensity obtained by each horizontal scan is stored in the accumulative slit line intensity memory circuit 6. The average intensity over one frame period is calculated by the average value calculating circuit 7. The calculated value is compared with predetermined upper limit and lower limit in the comparator 8, the upper and lower limit being preset by the accumulative slit line intensity setter 9. The pulse width and the pulse height of the slit light are set by the microcomputer 10 so that the calculated value falls within the preset range. In particular, if the average intensity over one frame period lies outside the preset range defined by the upper and lower limits, then at least one of the pulse width r and the pulse height h of the slit light is varied in given quantity so that the average intensity may fall within the preset range. For example, the pulse width can be finely changed in unit of one horizontal scanning time of 63.5 microseconds. The pulse height can be finely varied in unit of 1/64 of a rated value for the case of 6 bits. Where the average intensity is in excess of the upper limit, the pulse width or the pulse height is reduced by 63.5 microseconds or 1/64, respectively, every pulse emission. When the average intensity drops below the upper limit, the set pulse width or pulse height is retained constant. Likewise, when the average intensity is lower than the lower limit, the pulse width or the pulse height is increased in the given quantity. As an example, when only the pulse width is varied, if the average intensity cannot fall within the preset range, then the pulse height may also be varied.

If the average intensity differs greatly from both upper limit and lower limit, and if either the pulse width or the pulse height is varied every pulse emission, then it takes a relatively long time for the average intensity to fall within the preset range. In this case, each unit is multiplied by a factor proportional to the deviation of the average intensity and the preset values. As a result, the average intensity converges within the preset range at a higher speed. This shortens the time taken to make a measurement.

Since the $\Sigma Vi$ is obtained by integrating the intensity values of slit lines, the intensity can be automatically set with higher accuracy than in the case where either the width of the slit line or the maximum value of the slit line intensity is used in setting the intensity of the projected slit light. In this way, practical and meaningful advantages can be had.

EXAMPLE 3

Figure 5:
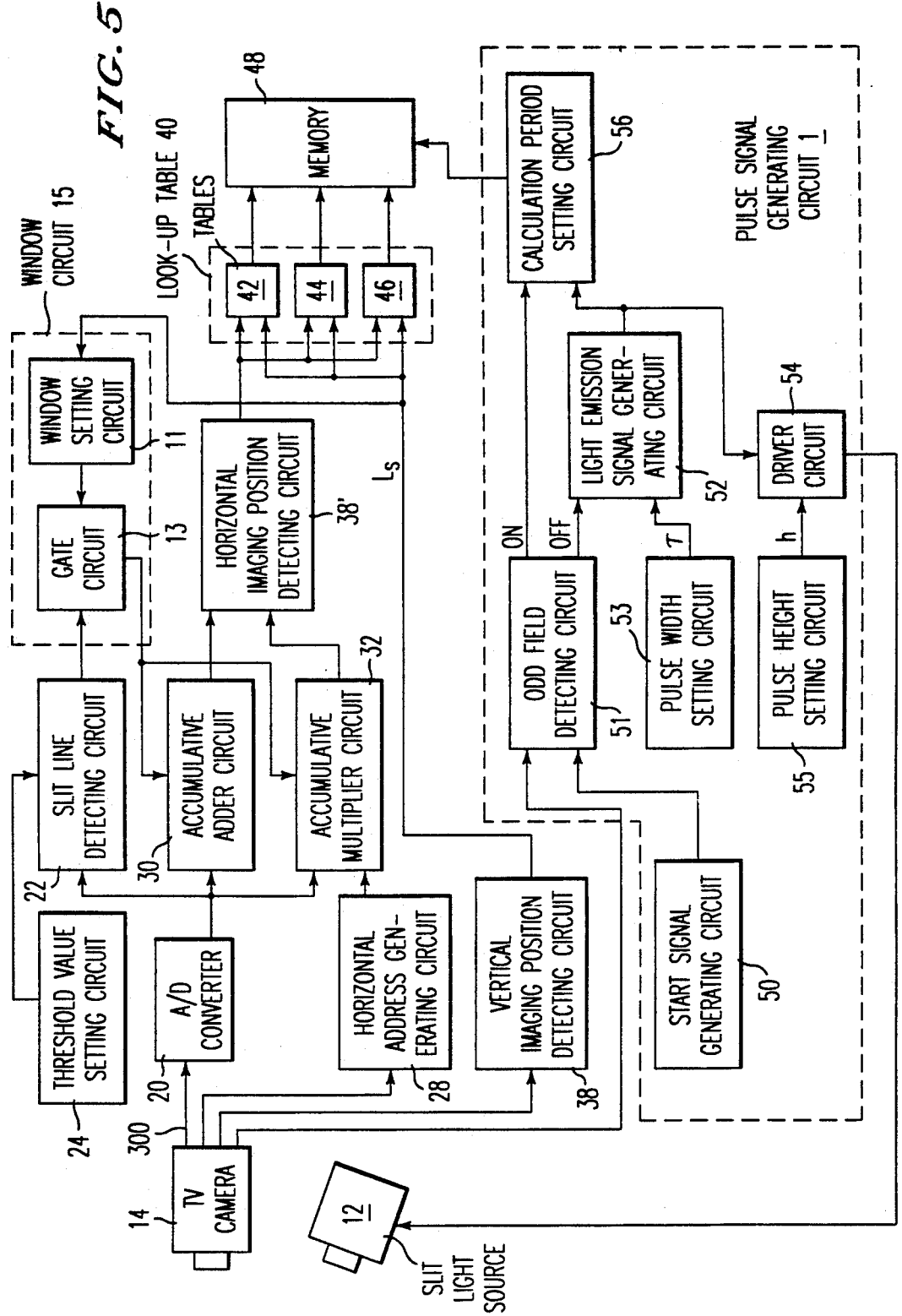
FIG. 5 is a block diagram of a third example of the invention.
Figure 6A:
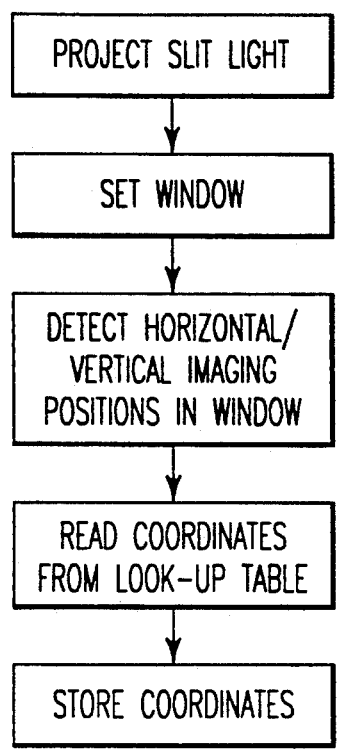
FIG. 6(a) is a flowchart illustrating the third example of the invention.
Figure 6B:
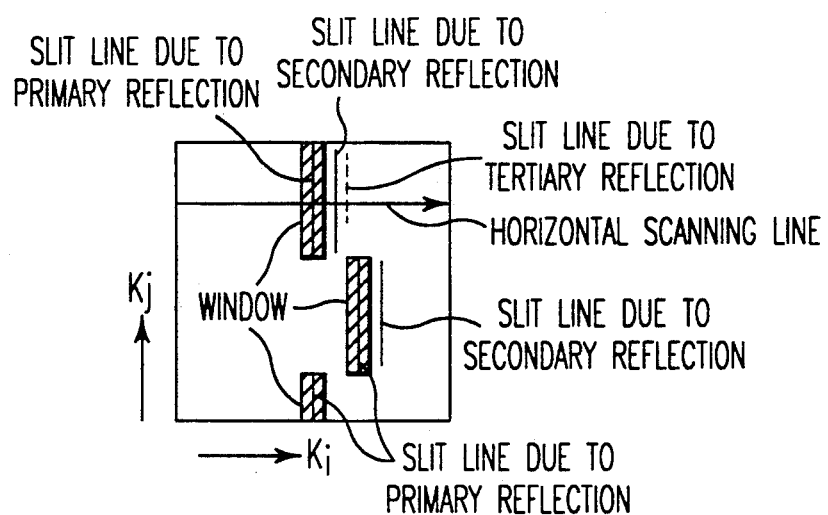
FIG. 6(b) is a diagram showing the condition of the video signal from a TV camera when multiple reflection takes place.

The third example of the invention is shown in FIG. 5 A window circuit 15 comprises a window setting circuit 11 and a gate circuit 13. A window is set in the requisite region whenever the TV camera makes a horizontal scan. This region is the area in which primary reflected components from the object are imaged when slit light is projected onto the object. When the shape of the object to be measured is known, the region can be determined in advance. Only the slit line existing in this window is detected by the gate circuit 13 and delivered to an accumulative adder circuit 30 and to an accumulative multiplier circuit 32. In this apparatus, the window is previously set so as to remove secondary, tertiary, and other components creating multiple reflection as shown in FIGS. 6(a) and 6(b). Consequently, this third example is capable of detecting three-dimensional coordinates without being affected by multiple reflection. This practical and meaningful feature cannot be accomplished by the previous examples.

EXAMPLE 4

Figure 11:
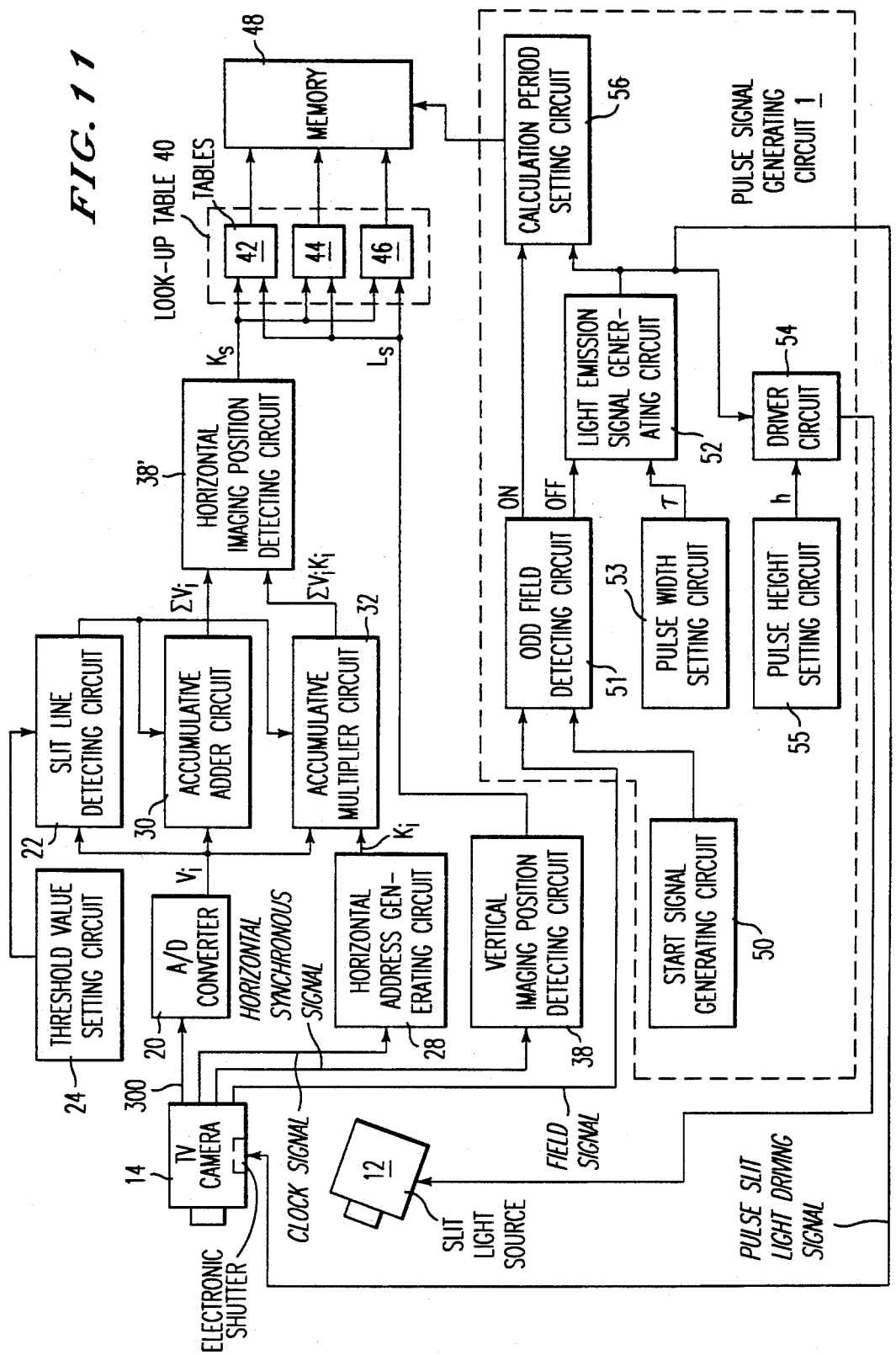
FIG. 11 is a block diagram of a fourth example of the invention.
Figure 12:
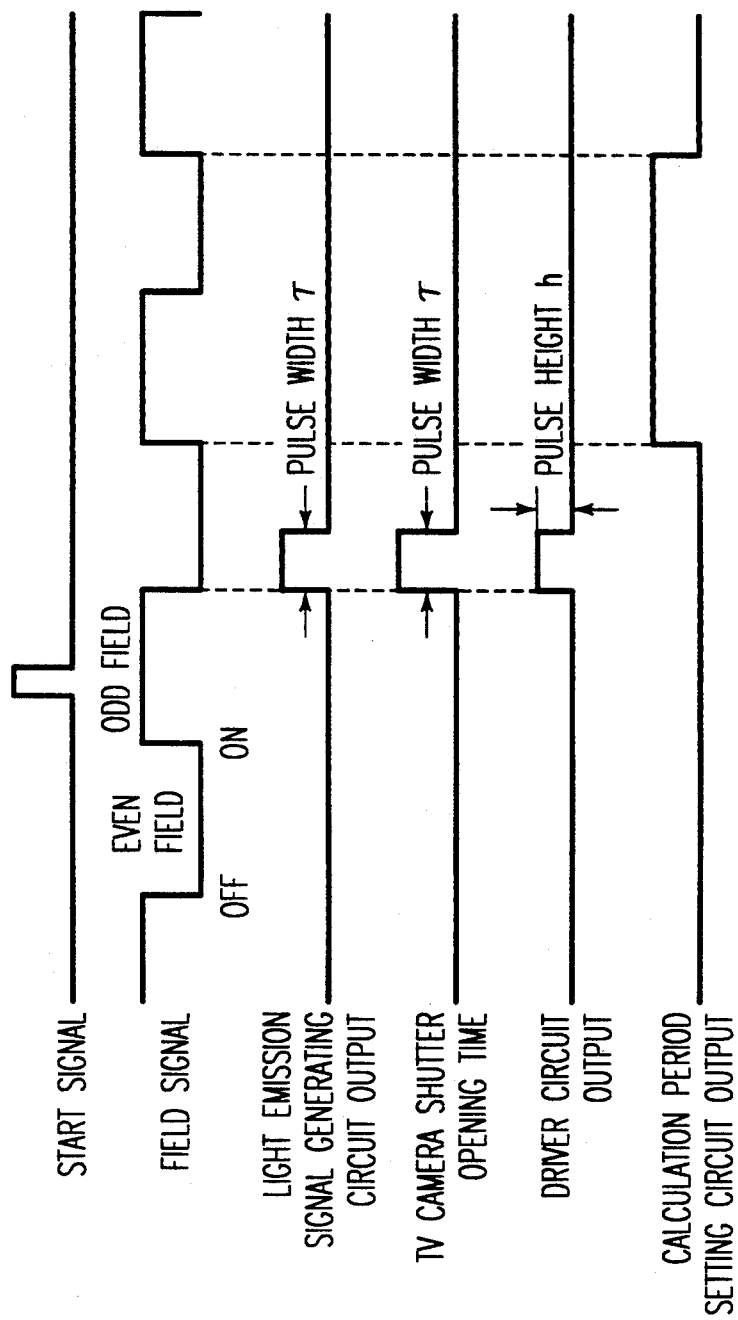
FIG. 12 is a timing chart illustrating the fourth example of the invention.

The fourth example of the invention is shown in FIGS. 11 and 12. A TV camera 14 having electronic shutter function is used, and a light projection signal generating signal for pulse light projection is applied to the shutter control input circuit of the TV camera. The shutter is opened only during the emission of each pulse to measure the three-dimensional coordinates on a vibrating or moving object with a high signal-to-noise ratio under disturbing light having a wide range of wavelengths such as sunlight even though the object exhibits widely different reflectivities. This example differs only in this respect; in other respects, this example is similar to the above examples.

EXAMPLE 5

Figure 13:
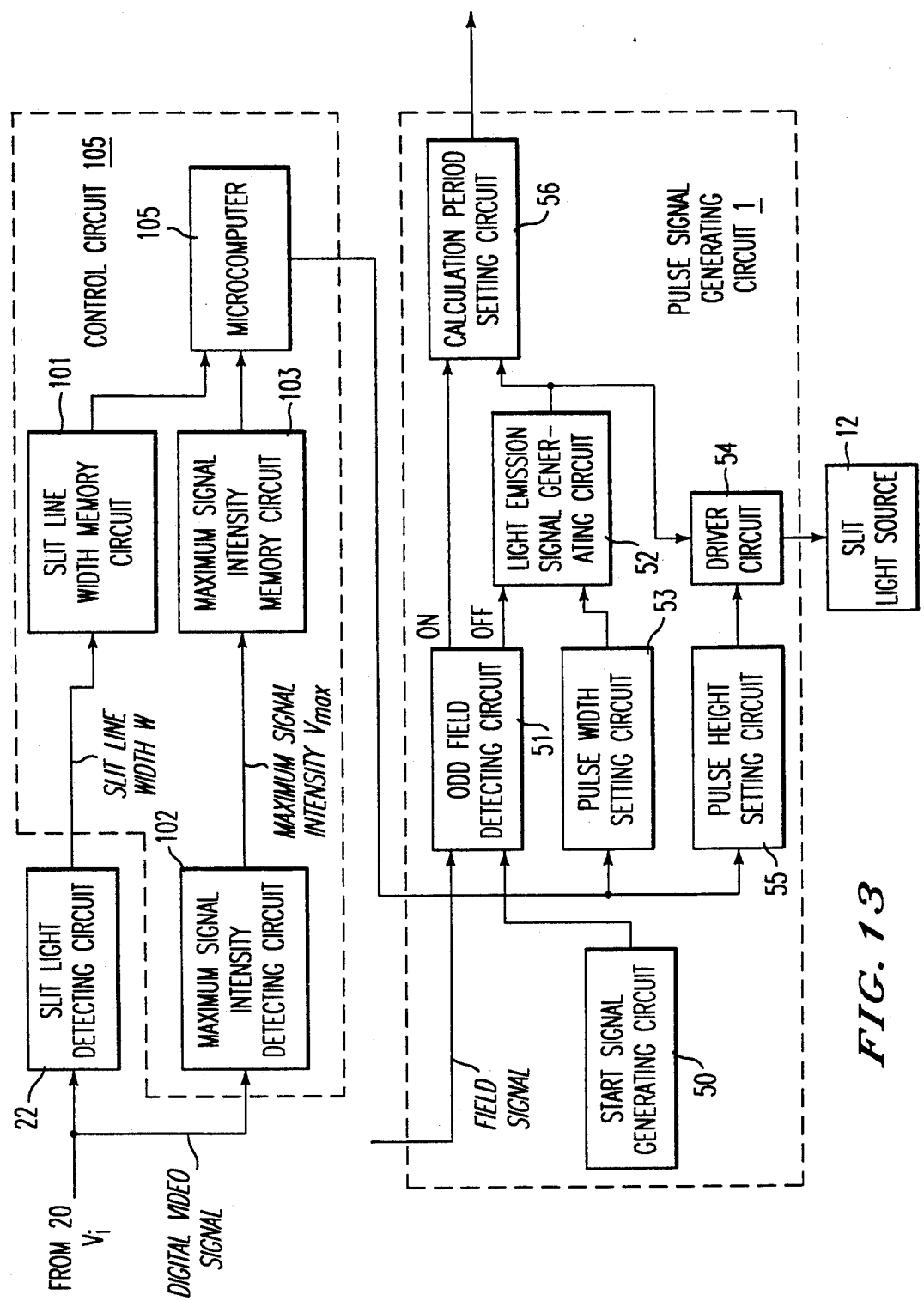
FIG. 13 is a block diagram of a fifth example of the invention.

Referring to FIG. 13, there is shown the fifth eample of the invention. In this example, a control circuit 105 comprises a slit line width memory circuit 101, a maximum signal intensity detecting circuit 102, a maximum signal intensity memory circuit 103, and a microcomputer 100.

In this fifth example built as described above, the microcomputer 100 is connected with the pulse width setting circuit 53 and the pulse height setting circuit 55 included in the pulse signal generating circuit. The maximum intensity of the slit line signal is detected by the maximum signal intensity detecting circuit 102 whenever the TV camera makes a horizontal scan. The maximum intensity of the slit line signals obtained from all the horizontal scans is stored in the maximum signal intensity memory circuit 103. On the other hand the output from the slit line detecting circuit 22 corresponds to the width of the slit line. The value of this output is stored in the slit line width memory circuit 101 for all the horizontal scan. These stored slit line widths and maximum signal intensities for all the horizontal scans are input to the microcomputer 100, which performs predetermined processing of signals, e.g., calculation of the average slit line width over one frame period, calculation of the average maximum signal intensity over one frame period, and calculation of the average value of the product of the slit line width and the maximum signal intensity over one frame period. The microcomputer 100 sets the pulse width and the pulse height of the slit light in such a way that the results of processing become equal to the predetermined values. The relation of the maximum signal intensity to the intensity of the projected slit light, or pulse height, is shown in FIG. 9(a). The relation of the width of the slit line to the intensity of the projected slit light, or the pulse height, is shown in FIG. 9(b). The relation of the product of the slit line width and the maximum signal intensity to the intensity of the projected slit light, or the pulse height, is approximately shown in FIG. 9(c). Thus, the intensity of the projected slit light can be controlled with substantially the same accuracy achieved in the previous examples but with greater ease, using the width of the slit line, the maximum signal intensity, or the product of them.

Where the object to be measured vibrates or moves at a high speed, the pulse width of the slit light is kept narrow but the pulse height is varied to control the energy of the projected slit light. This makes it possible to obtain a sharp image without blur. For instance, it is assumed that the object vibrates at amplitudes of $\pm 1$ mm at a frequency of 10 Hz. In order to measure the object at an accuracy of $\pm 0.1$ mm without blur, i.e., as a stationary object, if the measuring accuracy is $\pm 0.02$ mm, then the pulse width is required to be about 500 microseconds.

On the other hand, where the reflectivity of the object varies widely, the method relies principally on changes in the pulse width, since the pulse height can be varied only within a relatively narrow range as described previously. Because the energy of the projected slit light is controlled over a wide range in this way, the measurement is enabled for objects showing any reflectivity. In this case, the control can be made in a still wider range by using the product of the pulse height and the pulse width.

INDUSTRIAL APPLICABILITY

In accordance with the present invention, X, Y, Z coordinates on the surface of an object to be measured can be accurately detected on a real-time basis if the object moves or vibrates at a high speed or if the reflectivity of the object varies widely. Therefore, in manufacturing processes for mechanical parts or products, measurements or inspection of their dimensions can be made by in-line processing. This not only facilitates automating the manufacturing processes but also improves the inspection accuracy greatly over the case in which the measurement or inspection is effected by persons.

We claim:

1. An XYZ coordinates measuring system comprising:
   a slit light source for projecting slit light toward the surface of an object to be measured at a given angle;
   a TV camera for imaging the slit line formed on the surface of the object by the slit light;
   a pulse signal generating circuit which supplies pulse light projection signal for driving the slit light source to project a pulse light in synchronism with the field signal from the TV camera and which outputs a calculation period setting signal;
   an A/D converter circuit for converting a video signal outputted from the TV camera in synchronism with each horizontal scan of the TV camera into a digital video signal Vi;
   a threshold value-setting circuit that sets a threshold value used to detect the slit line from the video signal;
   a slit line detection circuit for outputting a slit line detection signal only while the digital video signal Vi is in excess of the threshold value;
   a horizontal address generating circuit for producing horizontal addresses Ki indicating the positions of horizontal picture elements of an imaging device of the TV camera;
   an accumulative adder circuit for accumulating the video signal Vi outputted via the A/D converter circuit while the slit line detecting circuit is outputting the slit line detection signal;
   an accumulative multiplier circuit for accumulating the product Vi×Ki of the video signal Vi outputted via the A/D converter circuit and the horizontal address Ki outputted from the horizontal address generating circuit while the slit line detecting circuit is outputting the slit line detection signal;
   a horizontal imaging position detecting circuit which divides the output ΣVi×Ki from the accumulative multiplier circuit by the output ΣVi from the accumulative adder circuit and produces the resulting quotient Ks as a horizontal imaging position signal;
   a vertical imaging position detecting circuit which counts horizontal synchronous signals from the TV camera and detects the vertical imaging position Ls;
   a look-up table in which tables showing the relations of horizontal and vertical imaging positions to the actual values of the XYZ coordinates on the surface of the object have been previously stored, correcting the distortion of lens of the TV camera, and which outputs the values of the XYZ coordinates on the surface of the object according to the detected horizontal imaging position Ks and the vertical imaging position Ls; and
   a memory to which the XYZ coordinates taken from the look-up table are written only during certain periods. synchronism with the calculation period setting signal, whereby the system measures the XYZ coordinates on the surface of the object along the slit line on a real-time.

2. The XYZ coordinates measuring system of claim 1, wherein said pulse signal generating circuit produces the calculation period setting signal only during a frame period immediately subsequent to a field period during which the signal for driving the slit light source to project a pulse light is outputted.

3. The XYZ coordinates measuring system of claim 1, wherein said pulse signal generating circuit includes a start signal generating circuit for outputting a start signal indicating the start of a measurement according to the position of the object inside the measured region, and outputs the signal for driving the slit light source to project a pulse light during a field appearing immediately subsequent to the generation of the start signal.

4. The XYZ coordinates measuring system of claim 1, further including means for determining a maximum intensity of said slit line and a control circuit which controls the intensity of the projected slit light according to at least one of the width of the slit line represented by said slit line detection signal outputted from said slit line detection circuit and the maximum intensity of the slit line detected at every horizontal scan.

5. The XYZ coordinates measuring system of claim 1, further including a control circuit which controls the intensity of the projected slit light according to the output ΣVi from the accumulative adder circuit.

6. The XYZ coordinates measuring system of claim 1, wherein said TV camera has an electronic shutter which is opened only while the pulse signal generating circuit is generating a pulse light projection signal.

7. The XYZ coordinates measuring system of claim 1, further including a window circuit connected to said slit line detection circuit and said vertical imaging position detecting circuit which sets a window having a width greater than the width of said slit line and a length substantially equally to the length of said slit line at every horizontal scan of the TV camera and detects only the slit line existing within said window.

* * * * *